(12) United States Patent
Kitagawa (10) Patent No.: US 6,463,213 B1
(45) Date of Patent: Oct. 8, 2002

(54) FILM UNIT PICKING DEVICE

(75) Inventor: Kiichiro Kitagawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 7 days.

(21) Appl. No.: 09/702,734

(22) Filed: Nov. 1, 2000

(30) Foreign Application Priority Data

Nov. 1, 1999 (JP) .......................................... 11-310602

(51) Int. Cl.$^7$ ................................................ G03B 17/50
(52) U.S. Cl. .......................................... 396/36; 396/37
(58) Field of Search .................................... 396/36, 37

(56) References Cited

U.S. PATENT DOCUMENTS

| | | | | |
|---|---|---|---|---|
| 3,741,095 A | * | 6/1973 | Harvey | 396/36 |
| 4,047,192 A | * | 9/1977 | Johnson et al. | 396/395 |
| 4,068,244 A | * | 1/1978 | Douglas | 396/360 |
| 4,107,710 A | * | 8/1978 | Harvey | 396/185 |

FOREIGN PATENT DOCUMENTS

JP 8-54680 2/1996 ........... G03B/17/52

* cited by examiner

*Primary Examiner*—D. Rutledge
(74) *Attorney, Agent, or Firm*—Sughrue Mion, PLLC (57) ABSTRACT

A film unit picking device including a picking claw for engaging an edge of a film unit loaded in a film unit cassette, subsequent to exposure by a exposure unit and advancing the film unit into a bite of a pair of processing liquid spread rollers, wherein the picking claw can be shifted between a first position at which the picking claw is off or slightly touched to the film unit and a second position at which the picking claw can be engaged with a trailing edge of the film unit in connection with the movement of the picking claw to advance the film unit. The picking claw is swingably mounted on a sliding plate being capable of reciprocally moving in a film unit advancing direction and being urged toward the film unit to be engaged with by a spring disposed between the sliding plate and the picking claw.

7 Claims, 7 Drawing Sheets

FIG. 8

FILM UNIT PICKING DEVICE

FIELD OF THE INVENTION

The present invention relates to film unit picking device which is applied to an instant camera or a printer using a self-developing type film unit loaded in a cassette.

BACKGROUND OF THE INVENTION

In a camera using a mono-sheet type self-developing film unit, which is also called integral or non-peel apart self-developing film unit, (hereinafter simply referred to as "film unit"), upon finishing exposure, a film unit picking claw moves in a slot formed in a peripheral flange, defining an exposure aperture, of a cassette of a film pack to advance the film unit through the exit of the cassette into a bite of a pair of processing liquid spread rollers. The pair of rollers further advances the film unit out of the camera body while, spreading the processing liquid within the film unit.

Japanese Laid-open Patent 054680/96 (tokkai-hei 08-054680) assigned to Fuji Photo Film Co., Ltd discloses an instant camera with a film unit picking claw swingably mounted on a sliding plate where the picking claw is spring-based toward the film unit to securely engage the film unit for its reliable advancing. However, such a spring-based picking claw tends to cause a problem that the portion of the film unit where the picking claw is urged against is given a deformation which subsequently decreases a gap between the film unit and the adjacent one when a film unit or stacked film units in the cassette accommodated in the camera is left for a long time without being used or under a high-temperature condition. Such deformation of the film unit makes it difficult to securely pick the exposed film unit to advance, and typically causes engagement with two adjacent film units together resulting in failure of processing and discharging the film unit.

SUMMARY OF THE INVENTION

An object of the invention is to provide an improved picking claw device described as follows to resolve the aforementioned problems caused by the film unit deformation and to discharge an exposed film unit without fail.

A film unit picking device comprises a picking claw for engaging an edge of a film unit loaded in a film unit cassette, subsequent to exposure by an exposure unit, and advancing the film unit into a bite of a pair of processing liquid spread rollers, wherein the picking claw can be shifted between a first position at which the picking claw is off or slightly touched to the film unit and a second position at which the picking claw can be engaged with a trailing edge of the film unit in association with the movement of the claw to advance the film unit.

The picking claw is mounted on a sliding member being capable of reciprocally moving in a film unit advancing direction and being urged toward the film unit to be engaged with by a biasing member such as a spring disposed between the sliding plate member and the picking claw.

Also a stopping member is formed on a wall and the like located close to the picking claw which is capable of being engaged with the picking claw to prevent the claw from being urged against the film unit and capable of being disengaged from the picking claw in connection with the movement of the claw to advance the unit. The stopping member and a portion incorporated with the claw cooperate with each other to keep the picking claw at the first position by engaging each other.

A first type of stopping member is made of a projection formed on the wall of a film unit receiving chamber, the projection is located in a position where the picking claw can be engaged therewith when it stays in the first position and the picking claw can be disengaged when it moves in the film unit advancing direction.

A second type of stopping member is formed on the exposure unit so that the stopping member and the picking claw can be disengaged when the exposure unit moves for preparation before exposure or for starting exposure.

A third type of stopping member is formed on the exposure unit so that the stopping member and the picking claw can be disengaged when the exposure unit moves for preparation before exposure or for starting exposure.

A fourth type of stopping member is formed on the lens barrel 20 so that the stopping member and the picking claw can be disengaged when the lens barrel is moved to extend from the camera body.

A fifth type of stopping member is formed on a exposure head so that the stopping member and the picking claw can be disengaged when the exposure head is moved to scan the film unit for exposure. The exposure head is moved by a scanning mechanism along the surface of the film unit to make a print in a printer using an instant photographic film unit or an electronic camera with that printer.

Those film unit picking devices can prevent a deformation of the film unit caused by a long-term or under-the-high-temperature-condition urging by the spring-biased claw.

BRIEF DESCRIPTION OF THE DRAWINGS

FIG. 2 shows a perspective view of the instant camera the invention is applied to.

DETAILED DESCRIPTION OF THE INVENTION

Figure 2:
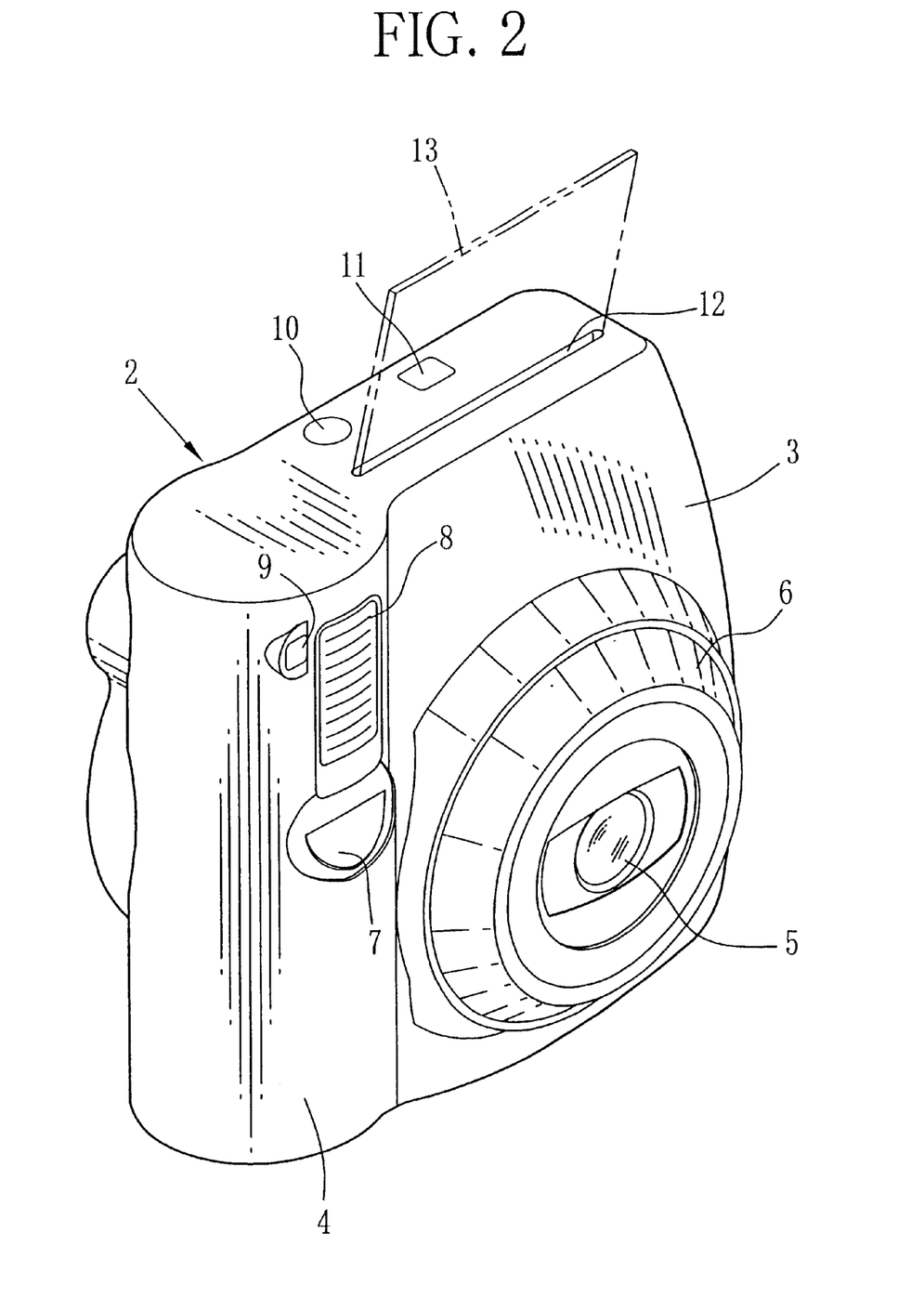

FIG. 2 shows an external view of an instant camera to which the picking claw device of the invention is applied. The instant camera has a book-like-shaped camera body 3, on the front side of which is disposed a retractable lens barrel 6 incorporating a zoom taking lens 5.

In the left-hand side of the front side of the camera body 3 is formed a grip portion 4 where a shutter release button 7, a flash emitting window 8 and a view finder window 9 are disposed. On the top side of the camera body 3 are disposed a power switch button 10, a film counter window 11 and a film exit slot 12 for discharging an exposed and self-developing film unit 13.

Figure 3:
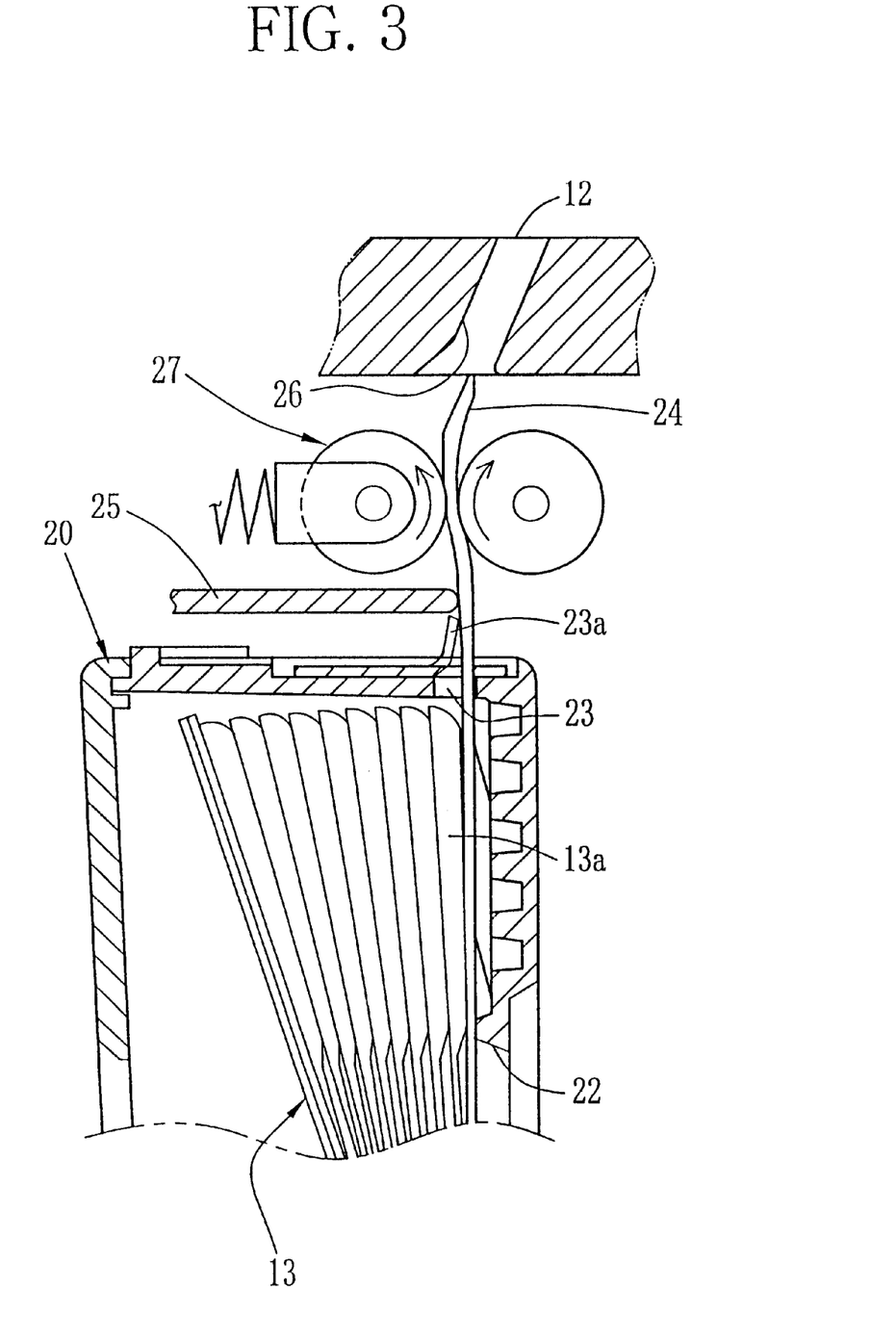
FIG. 3 shows the components and their layout of the instant camera in the vicinity of a pair of processing liquid spread rollers.

FIG. 3 shows film pack 20, accommodated in the camera 3, that includes ten stacked film units 13, each with a rupturable processing liquid pod 13a, and a cassette holding the stacked film units inside. The film pack 20 has an exposure aperture 22 in the front side and an exit slot 23 in the top side. The taking lens 5 and other photographing components (not shown) such as an exposure controller and a shutter driver are disposed facing the exposure aperture 22 of the film pack.

An exposed film unit 13 is discharged through the exit slot 23. The exit slot 23 is light shielded with a light shielding cover 23a of which one end is fixed on the wall of the film pack 20 and the other end is free which can be pushed up when the film unit 13 is discharged through the exit slot 23.

Figure 4:
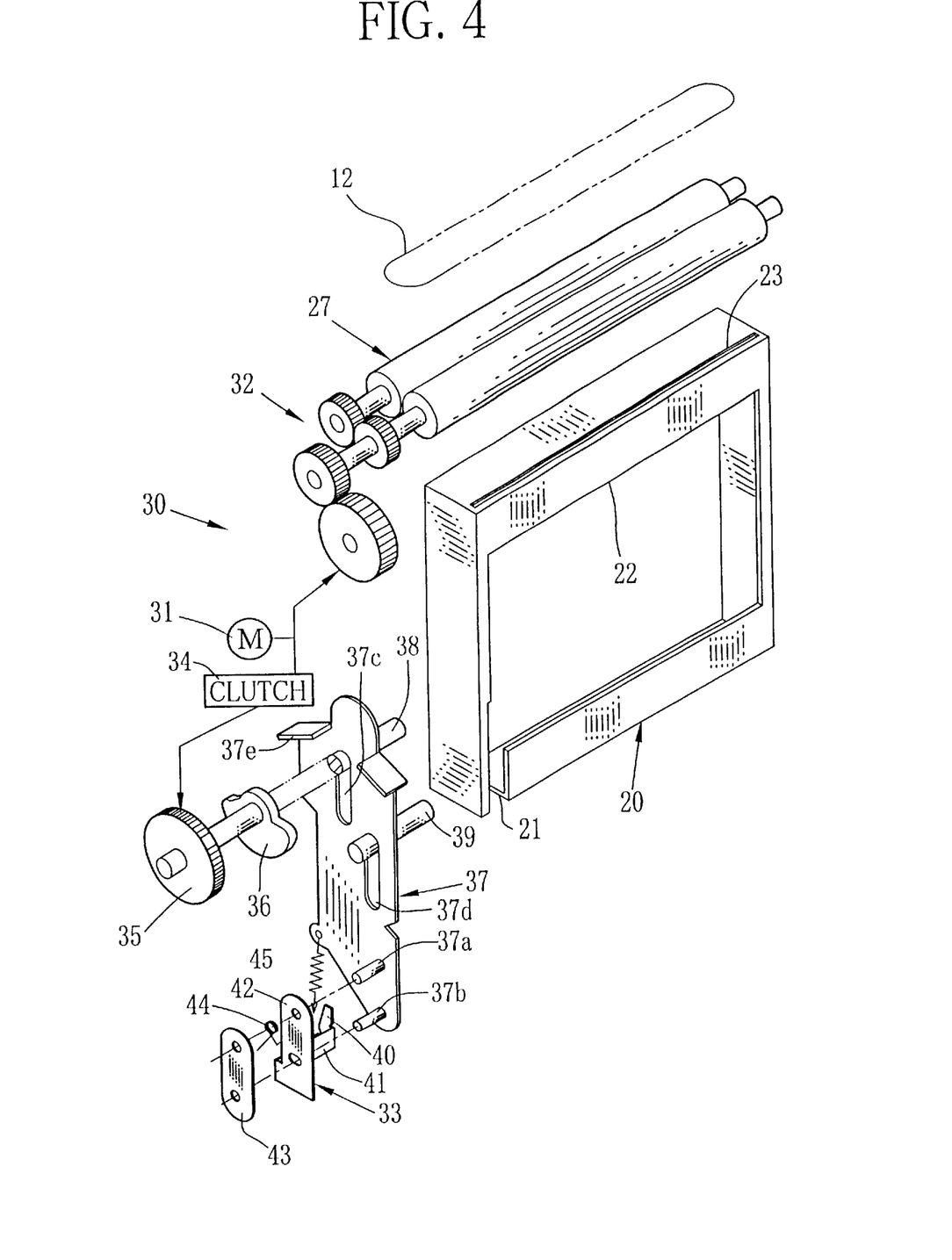
FIG. 4 is an exploded perspective view showing a film unit 15 advancing mechanism.

A pair of processing liquid spread rollers 27 is located close to the top side of the film pack 20 where the exit slot 23 is formed in the camera body 3. As shown in FIG. 4, a gear train 32 is connected to the ends of a pair of processing liquid spread rollers 27, which is driven by a motor 31. The rollers 27 ruptures the processing liquid pod 13a by nipping to spread the processing liquid within the film unit 13 while advancing the film unit 13. A spread controlling plate 25 is disposed between the rollers and the film pack which controls evenness of the layer of spread processing liquid to be flat by pressing the opposite side to an exposed side of the film unit 13.

FIG. 4 shows a film unit picking device 30 of the invention which is disposed in the camera body 3 beside the side wall of the film pack 20. The film unit picking device 30 includes cam 36, sliding plate 37, a picking claw 33, springs 44 and 45 and a motor 31. The sliding plate 37 is slidably mounted on the camera body with a combination of slots 37c, 37d, cam shaft 38 and guide shaft 39, which can slide reciprocally in the film unit advancing direction. The cam 36 and a gear 35 are fixed to the cam shaft 38, the gear is connected to a motor driven shaft via a clutch 34. The clutch 34 is disengaged at every one turn of the gear 35, which leads to one turn of cam 36.

A portion of the sliding plate 37 is folded to form a cam follower plate 37e. The sliding plate 37 is biased downwardly by a coil spring 45 so that the cam follower plate 37 can be urged against the cam 36. Accordingly the sliding plate 37 can make a reciprocal movement in the film unit advancing direction per one turn of the cam 36.

Figure 5:
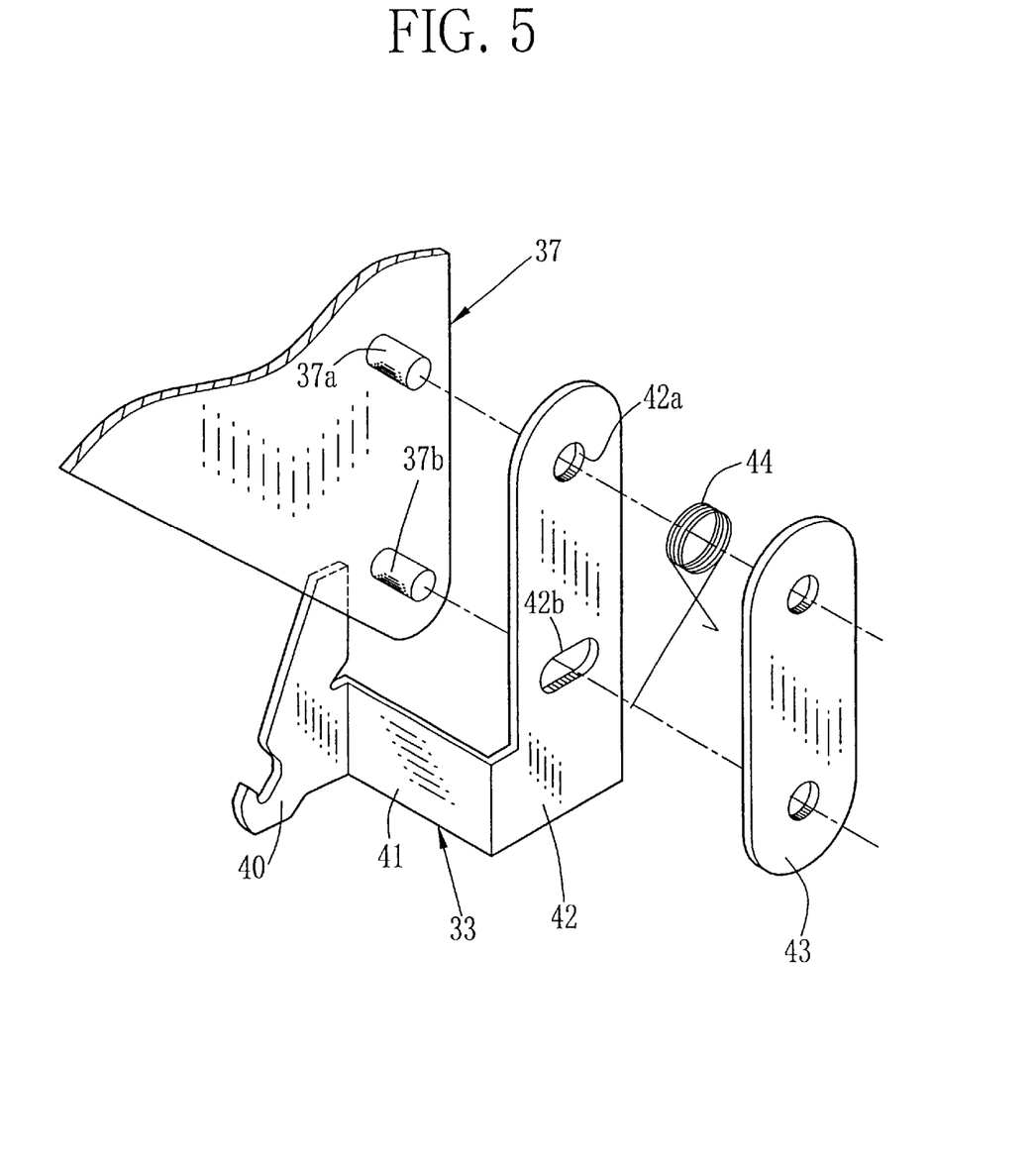
FIG. 5 is a perspective view showing the picking claw used in the invention.

The picking claw 33 is swingably mounted on the sliding plate 37 with a mounting rod 37a, a guiding rod 37b for swinging a fixing plate 43. The mounting rod 37a and the guiding rod 37b are projected from the sliding plate 37. As shown in FIG. 5, the picking claw 33 is constituted with a claw 40, a connecting plate 41 and a mounting bracket 42 which are integrally formed by folding a plate. A mounting hole 42a for the mounting rod 37a and a guiding slot 42b for the guiding rod 37b are formed in the mounting bracket 42. The guiding slot 42b is an arcuated one, the center of curvature of which is coincident with the axis of the mounted rod 37a. A spring 44 is secured to the mounting rod 37a which urges the picking claw 33 toward the film unit 13 to be engaged. Another type of spring, such as coil spring or leaf spring can be used for urging the picking claw. The fixing plate 43 functions as a reinforcing plate to prevent the mounting bracket 42 from being deformed.

Figure 1A:
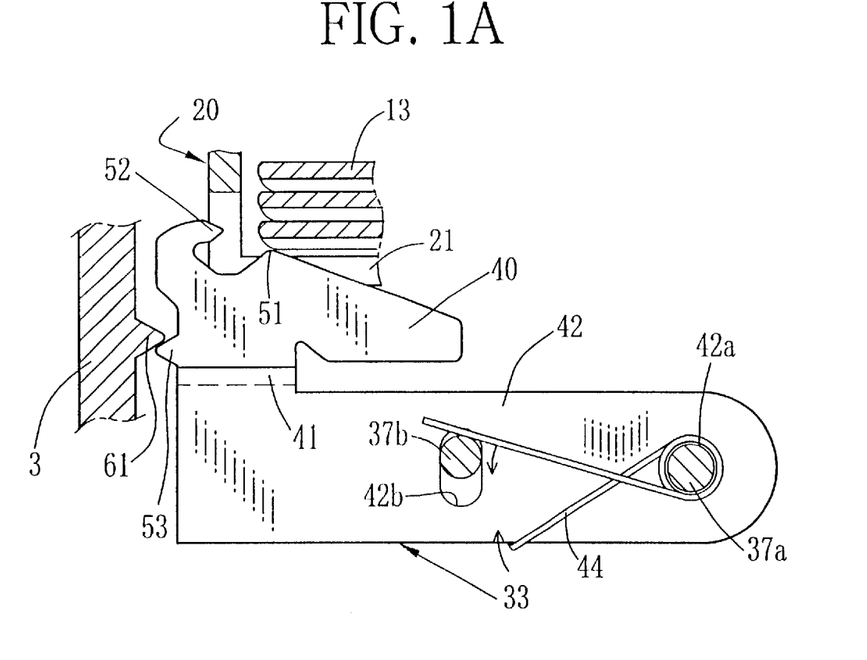
FIG. 1A is a side view showing a main part of the film unit picking device of the invention in the condition under which the picking claw is prevented from being urged against the film unit.

FIG. 1A in combination with FIG.4 shows the picking claw 33 mounted on the sliding plate 37, wherein the claw 40 is inserted into a slot 21 formed in a peripheral flange of the cassette of film pack and a hook portion 52 of the claw 40 is set in a position where the hook portion faces to the trailing edge of the film unit 13. This position defines the first position (also called home position, initial position or waiting position). In the first position, the picking claw 33 is engaged with a stopper 61 to prevent the claw 33 from being urged against the film unit 13 as explained later.

The claw 40 consists of a film unit contacting portion 51, the hook portion 52 and a stopper-engaging projection 53.

The stopper-engaging projection 53 is engaged with the stopper 61 which is a projection formed in a receiving chamber for receiving the film pack 20. Consequently, rotation of the picking claw toward the film unit 13 is prohibited as the picking claw keeps from contacting on the film unit even if the film pack is left in the camera for a long time or under a high-temperature condition, the conventional problem of deformation of film unit never occurs.

Figure 1B:
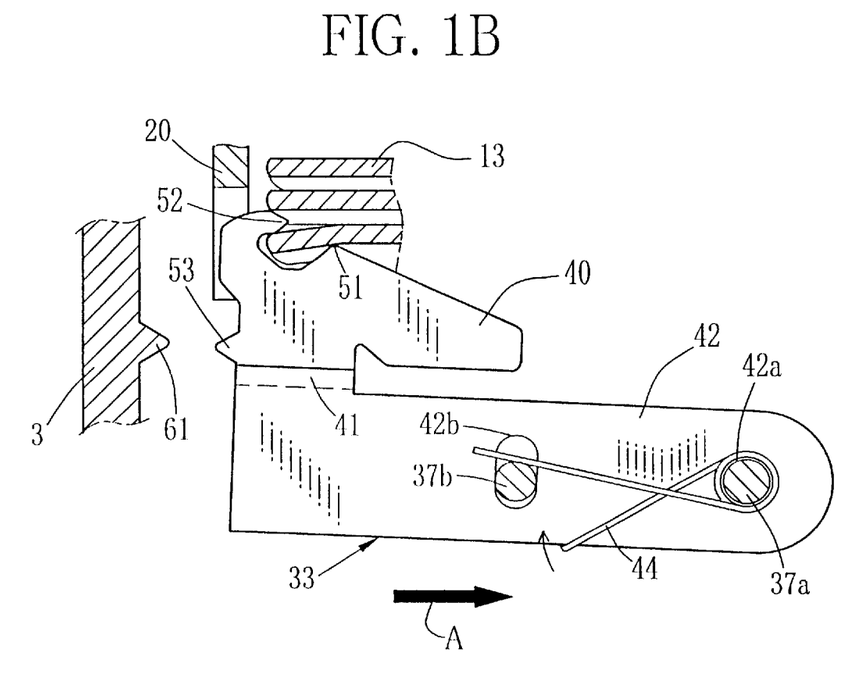
FIG. 1B shows the condition under which the picking claw is urged against the film unit.

When the sliding plate 37 (see FIG. 4) moves in a film unit advancing direction, the stopper 61 and the stopper-engaging projection 53 are disengaged at the beginning of the movement as shown in FIG. 1B. Then the picking claw 33 starts to rotate toward the film unit 13 (clockwise direction) to make the contacting portion 51 contact first on the bottom surface (exposure side) of the film unit 13 and keep being urged against it. Under this situation, the picking claw 33 moves in the film unit advancing direction (arrow A direction) to put the edge of the hook portion 52 into a gap between the first film unit (lowermost) and the next one. Thus, the picking claw 33 can engage only the edge of the first film unit by the hook portion 52 and advances it for certain into the bite of a pair of processing liquid spread rollers.

After the film unit reaches the pair of rollers, the sliding plate 37 returns to the initial position. At the end stage of returning, the stopper-engaging projection 53 is engaged with the stopper 61. In the process of completing the engagement, the projection 53 slips down under the stopper 61 contacting each other. Thus, the picking claw returns completely to the home position, which keeps the claw off the film unit. To make it certain that the engagement between the stopper 61 and the stopper-engaging projection is made, it is useful to slightly rotate the picking claw 33 counter-clockwise at the end stage of returning by using another camming mechanism.

Figure 6:
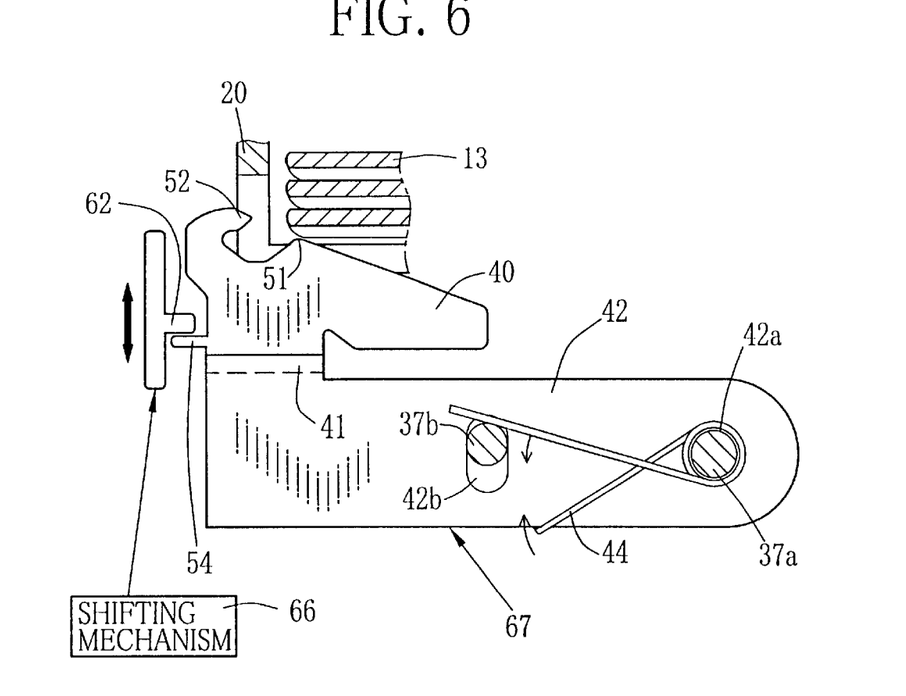
FIG. 6 is a side view showing a main part of the film unit picking device of another embodiment (stopper shifting ) of the invention.

FIG. 6 shows another embodiment where a stopper 62 is movable by shifting mechanism 66. The shifting mechanism 66 works in association with the movement of a picking claw 67 in the film unit advancing direction, i.e., the movement of the sliding plate. When the picking claw 67 returns to the initial position, the shifting mechanism 66 shifts a stopper 62 downwardly to engage with a stopper-engaging projection 54 of the picking claw. When the picking claw 67 moves again to advance the next exposed film unit, the stopper 62 and the picking claw 67 (stopper-engaging projection 54) are disengaged as in the previous embodiment. Then the claw 40 is rotated and urged against the film unit 13 by the spring 44 to engage an edge thereof for certain. Before the picking claw 67 returns to the initial position, the shifting mechanism 66 once shifts the stopper 62 upwardly for the next downward shifting. The shifting mechanism is driven by a solenoid or a motor.

In the above described embodiment, downward shifting of the stopper 62 is made when the picking claw 67 returns to the initial position. Other ways of downward shifting can be applied, for example, downward shifting is made when a power switch is turned off, more precisely, directly before the switch is actually turned off, or downward shifting is made in response to a user's operation of switching the manually operable switch installed on the camera body when the user finishes photographing. In any way described, the picking claw 67 can stay away from the film unit whenever the camera is not used.

Figure 7:
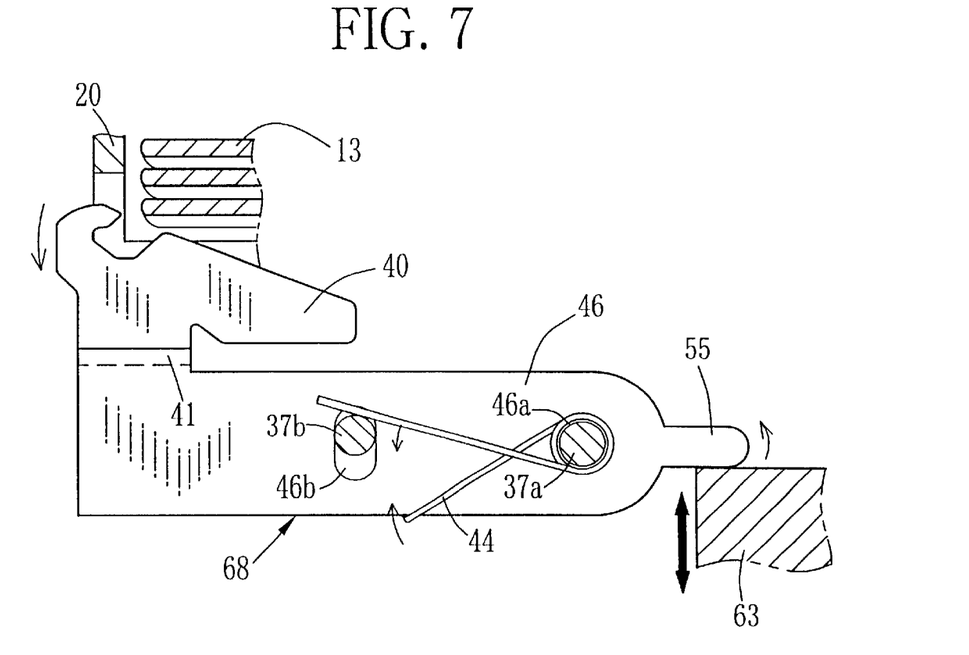
FIG. 7 is a side view showing a main part of the film unit picking device of another embodiment (stopper on the lens barrel) of the invention.

FIG. 7 shows another embodiment that a stopper 63 is formed on the retractable lens barrel 6 (see FIG. 2). The stopper 63 engages the stopper-engaging projection 55 formed on a mounting bracket when the lens barrel 6 is retracted into the camera body 3. Only when the lens barrel 6 is extended from the inside of the camera body 3 to take a picture, the stopper and the stopper-engaging projection are disengaged so that the film unit picking claw is ready for picking the film unit.

Figure 8:
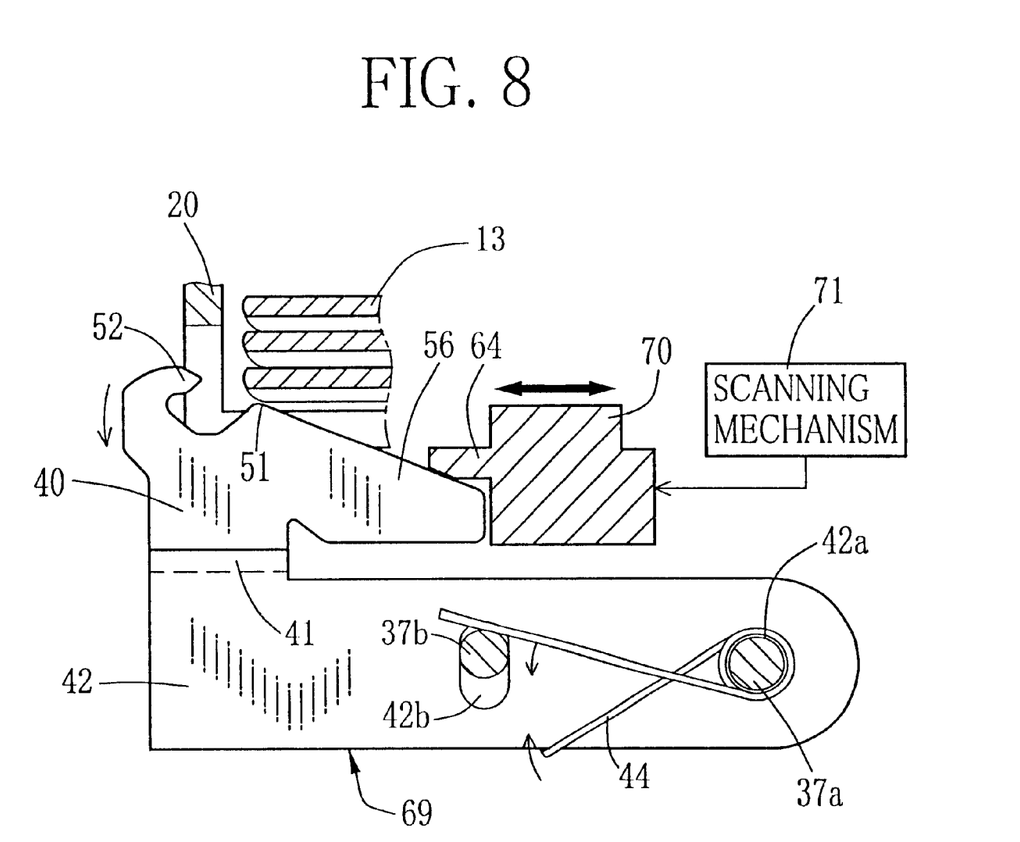
FIG. 8 is a side view showing a main part of the film unit picking device of another embodiment (stopper on the exposure head) of the invention.

Embodiments explained above apply the film unit picking device to an instant camera. Other applications can be made to a printer which uses an instant film unit or a camera incorporated with the printer. In the printer using the instant film unit, an exposure head scans along the film unit surface to be exposed. FIG. 8 shows that a stopper 64 is formed on an exposure head 70 which extends along with a main-scanning direction perpendicular to the film unit advancing direction. The exposure head 70 can reciprocally move over two zones, a waiting zone and an exposure zone (printing zone), in the film unit advancing direction. When the head 70 moves back to the waiting zone, the stopper 64 of the exposure head engages an engaging portion 56 of the claw 40 while slightly rotating the picking claw 69 counterclockwise around a mounting rod 37*a*. As a result, the picking claw 69 is kept off the film unit. When a printing command is generated, the exposure head 70 is moved by the scanning mechanism 71, in the film unit advancing direction, from the waiting zone to the exposure zone where the head exposes photographic layers of the film unit by spot lights of each line. The exposure head 70 is driven in synchronization with a moving speed of the head 70 to print each line in turn. At the beginning of this movement, the stopper 64 and the engaging portion 56 of the claw 40 are disengaged. Then after exposure (printing)is finished, the picking claw 69 picks the film unit 13 and advances it.

What is claimed is:

1. A film unit picking device comprising:

a picking claw configured to engage an edge of a film unit loaded in a film unit cassette, subsequent to exposure by an exposure unit, and configured to advance the film unit from a first position of the picking claw into a bite of a pair of processing liquid spread rollers;

a shifting assembly to shift the picking claw between the first position at which the picking claw is one of off and slightly touching the film unit and a second position at which the picking claw is engaged with the edge of the film unit in association with the movement of the picking claw to advance the film unit; and a stopping member arranged separately from the shifting assembly;

wherein the picking claw is configured to engage with the stopping member in order to position the picking claw in the first position so as to prevent the picking claw from being urged against the film unit.

2. A film unit picking device as defined in claim 1, wherein the picking claw is swingably mounted on a sliding member, which is operative to reciprocally move in a film unit advancing direction and which is urged toward the film unit to be engaged with by a biasing member disposed between the sliding member and the picking claw.

3. A film unit picking device as defined in claim 1, wherein the stopping member is operative to be disengaged from the picking claw in association with the movement of the claw to advance the unit.

4. A film unit picking device as defined in claim 1, wherein the stopping member is made of a projection formed on the wall of a film unit receiving chamber, the projection being located in a position where the picking claw is operative to be engaged therewith when the picking claw stays in the first position and the picking claw is operative to be disengaged when it moves in the film unit advancing direction.

5. A film unit picking device as defined in claim 1, wherein the stopping member is formed on the exposure unit so that the stopping member and the picking claw are operative to be disengaged when the exposure unit moves for preparation before exposure or for starting exposure.

6. A film unit picking device as defined in claim 5, wherein the exposure unit includes a lens barrel incorporating a taking lens and wherein the stopping member is formed on the lens barrel so that the stopping member and the picking claw are operative to be disengaged when the lens barrel is moved to extend from the camera body.

7. A film unit picking device as defined in claim 5, wherein the exposure unit includes an exposure head and a scanning mechanism for making the exposure head scan along the surface of the film unit to be exposed, and wherein the stopping member is formed on the exposure head so that the stopping member and the picking claw are operative to be disengaged when the exposure head is moved to scan the film unit for exposure.

* * * * *